Oct. 5, 1954  J. R. LIEN  2,691,099
SUPERREGENERATIVE RECEIVER-OSCILLATOR
Filed Feb. 14, 1946
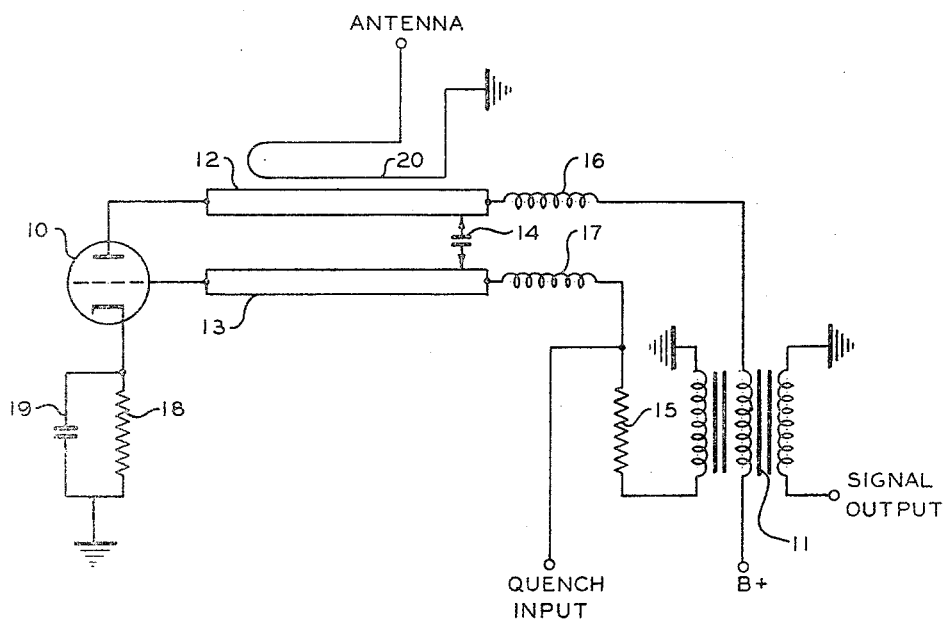
INVENTOR
JESSE R. LIEN
BY  M. C. Hayes
ATTORNEY Patented Oct. 5, 1954

2,691,099

UNITED STATES PATENT OFFICE 2,691,099

SUPERREGENERATIVE RECEIVER-OSCILLATOR

Jesse R. Lien, Los Angeles, Calif., assignor, by mesne assignments, to the United States of America as represented by the Secretary of the Navy Application February 14, 1946, Serial No. 647,594

3 Claims. (Cl. 250—20)

This invention relates to communication systems, and more particularly to apparatus for receiving and replying to radar signals.

In some types of communication it is desirable to have a unit, called a transpondor, which can receive a radar transmission and automatically and simultaneously transmit a reply. Such a transpondor, for example, is an integral part of a shore bombardment beacon. In shore bombardment, it is desirable to have a shore party at a location very close to the target. If the shore party knows the location of the target, and transmits that information to the ship, and if the ship's personnel have a method of finding the exact location of the shore party, the fire of the ship can be accurately directed to the target. It is the purpose of the shore bombardment beacon to give an indication at the ship's fire control radar that will supply the operators the exact azimuth and range of the shore party.

In general terms, the beacon consists of a transmitter and receiver so interconnected that when a pulse is received from a radar, the beacon will automatically, and for all practical purposes, simultaneously, transmit a reply signal. The radar which supplies the signal to the beacon's receiver measures the time difference between the sending out of a radar pulse and the reception of the corresponding beacon reply. From this information it computes the exact distance from the ship's radar to the beacon. The radar has provisions for determining the exact azimuth of the beacon. In practical operation, the transmitter of the beacon is tuned a few megacycles away from the radar frequency and the radar receiver is detuned to the frequency of the beacon's reply. This eliminates the normal radar signals when the beacon is being received.

Since the shore party must be highly mobile, it is obvious that size and weight are big factors in the design of a shore bombardment beacon. The complete equipment is generally packed in one carrying case and may consist of the transpondor, an antenna, a control box, and batteries. The transpondor, electrically, may consist of one or two high frequency oscillators that function as a receiver and a transmitter (in some cases, one oscillator serves a dual function), a quench oscillator for inducing super-regenerative action in the receiver, a video amplifier to amplify the receiver output, a blocking oscillator used to set the modulator into action, and a pulse modulator to fire the transmitter. Since the present invention is concerned only with the transpondor, no description of the other units will be given.

It is the object of the present invention to provide improved apparatus for receiving and replying to pulsed signals.

It is a further object to combine the functional operation of a super-regenerative receiver and a blocking oscillator in a single circuit.

It is another object to decrease the number of components necessary for satisfactory transpondor operation.

These and other objects will be more apparent upon consideration of the following specifications, taken with the accompanying drawing, the single figure of which illustrates an embodiment of the present invention.

Briefly, the circuit associated with tube 10 is that of a normal super-regenerative receiver. The output, however, is reversed in phase through transformer 11, and fed to the grid in a quantity sufficient to self-trigger the tube as a blocking-grid oscillator.

Electron tube 10, having a cathode, control grid, and plate, has a resonant circuit connected between the latter two elements. The physical form that the resonant circuit takes will depend on the operating frequency; in the present case, resonant lines 12 and 13 are used. Capacitor 14, with its associated sliding contacts, serves to tune the resonant circuit to the desired operating frequency. Plate line 12 is connected to a source of B+ through radio frequency choke 16 and the primary winding of transformer 11. The direct current grid return is through radio frequency choke 17, resistor 15, and the secondary winding of transformer 11. A source of quench voltage is connected to the intersection of radio frequency choke 17 and grid return resistor 15. Protective cathode bias is furnished by resistor 18, which is by-passed by capacitor 19. Coupling loop 20 provides for coupling an input signal from the antenna into the resonant circuit. The tertiary winding of transformer 11 couples the output signal to a jack marked "signal output" for connection to other circuits.

The initial action of the circuit is like that of a normal super-regenerative receiver. Tube 10 is utilized as an amplifier having positive voltage feedback, the amount of this feedback, or regeneration, being continuously varied by a quench voltage applied to the grid. The quench voltage can take any desired form, sinusoidal quench being used in the present embodiment. Oscillations started in the resonant circuit by a received signal will build up if the signal is introduced during that portion of the quench cycle when the circuit is sufficiently regenerative. The envelope of the building-up signal appears across the primary of transformer 11, is reversed in phase across the secondary winding, and is fed to the grid in positive phase relationship to cause regeneration, the amount of regeneration being sufficient to self-trigger the tube as a blocking-grid oscillator. Normal blocking-grid oscillator action produces an output pulse across the tertiary winding of transformer 11, the width of said pulse being a function of the inductance of the primary winding of the transformer and of the amount of feedback. The amplitude of the output pulse is entirely sufficient to trigger a modulator. The regeneration which fires the tube as a blocking-grid oscillator must be of sufficient magnitude to self-trigger the tube only on input signals, and not on the quench itself.

Summarizing the operation, an R-F input signal builds up due to super-regenerative action, the regeneration being effected by feedback of the R-F oscillations through interelectrode and distributed capacitance. The envelope of these R-F oscillations is reversed in phase and fed back to the grid, and, when it attains sufficient amplitude, triggers the tube as a blocking oscillator. This regeneration is at the video frequency and is transformer coupled to the grid.

This invention, when used in a transpondor, results in a saving of components. Whereas, the previously described transpondor comprised a video amplifier for amplifying the output of the super-regenerative receiver and a blocking oscillator for firing the modulator, the video amplifier has been eliminated and the blocking oscillator physically combined with the receiver circuit.

Though the invention has herein been described in connection with its use in a shore bombardment beacon apparatus, it is obvious that it can be made an integral part of any transpondor unit, or of any other apparatus requiring the functional use of a super-regenerative receiver and a blocking oscillator. Similarly, any apparatus requiring the generation of a video pulse at a time coincident with reception of an R-F pulse may comprise a circuit as described herein. Changes may be made in the circuits disclosed without departing from the invention.

What is claimed is:

1. An electronic circuit comprising an electron tube having a cathode, an anode and a control grid, a resonant circuit connected between said control grid and said anode, means for coupling input pulses of radio frequency energy into said resonant circuit, means including said resonant circuit for positively feeding back radio frequency energy from said anode to said control grid to cause said tube to function as a regenerative amplifying stage, means for applying a sinusoidal quench voltage to said grid for cyclically varying the gain of said stage, a transformer having first and second windings, means for connecting said first winding in the anode circuit of said electron tube, means for connecting said second winding of said transformer in the grid circuit of said tube, said windings being coupled to provide positive feedback of the video envelope of said pulses of radio frequency energy whereby said tube performs as a blocking oscillator after said pulses of radio frequency energy build up to a predetermined amplitude and means coupled to said transformer for providing an output signal in response to the operation of said tube as a blocking oscillator.

2. An electronic circuit comprising an electron tube having a cathode, a control grid and an anode, a resonant circuit connected between said control grid and said anode, a parallel resistance-capacitance network connecting said cathode to a reference potential, means for coupling pulses of radio frequency energy into said resonant circuit, means including said resonant circuit for feeding back radio frequency energy from the anode to the control grid of said tube whereby said tube performs as a regenerative amplifying stage, means for applying a sinusoidal quench voltage to said control grid to cyclically vary the amount of regeneration in said amplifier, a transformer having first, second and third windings, a first radio frequency choke connected between the anode and one end of said first winding, the other end of said first winding being connected to a positive potential, a second radio frequency choke connected between the grid of said tube and one end of said second winding, the other end of said second winding being connected to said reference potential, said first and second windings providing positive feeding back for the video envelope of said pulses of radio frequency energy whereby said tube is transformed from a super-regenerative receiver to a blocking oscillator when the radio frequency pulses are amplified to a predetermined level, said third winding being coupled to said first winding to provide an output pulse in response to the operation of said tube as a blocking oscillator.

3. An electronic circuit comprising an electron tube having a cathode, an anode and a control grid, means for connecting said cathode to a reference potential through a parallel resistance-capacitance network, a resonant circuit connected between said anode and said control grid, means for coupling pulses of radio frequency energy into said resonant circuit, means including said resonant circuit for positively feeding back radio frequency energy from the anode to the control grid of said tube whereby said tube performs as a regenerative amplifier, means for applying a quench voltage to said control grid to regulate the amount of regeneration in said amplifier, and means for providing positive feedback betwen said anode and said control grid for the video envelope of said pulses of radio frequency whereby said tube is transformed from a regenerative receiver to a blocking oscillator whenever said radio frequency energy is amplified to a predetermined level, and means for providing an output pulse in response to the blocking oscillator action of said electron tube.

References Cited in the file of this patent

UNITED STATES PATENTS

| Number | Name | Date |
|---|---|---|
| 1,907,874 | Roberts | May 9, 1933 |
| 1,948,315 | Roberts | Feb. 29, 1934 |
| 1,982,694 | Roberts | Dec. 4, 1934 |
| 2,008,261 | Roberts | July 16, 1935 |
| 2,027,828 | Knight | Jan. 13, 1936 |
| 2,071,950 | Reinartz | Feb. 23, 1937 |
| 2,091,546 | Hruska | Aug. 31, 1937 |
| 2,147,595 | Hilferty | Feb. 14, 1939 |
| 2,410,768 | Worcester, Jr. | Nov. 5, 1946 |
| 2,410,981 | Koch | Nov. 12, 1946 |
| 2,412,710 | Bradley | Dec. 17, 1946 |
| 2,416,794 | Crosby | Mar. 4, 1947 |
| 2,447,375 | Taylor | Aug. 17, 1948 |
| 2,501,186 | Okrent | Mar. 21, 1950 |

FOREIGN PATENTS

| Number | Country | Date |
|---|---|---|
| 379,426 | Great Britain | Sept. 1, 1932 |
| 437,460 | Great Britain | Oct. 30, 1935 |